US008265906B2

(12) United States Patent
Bondi et al.

(10) Patent No.: US 8,265,906 B2
(45) Date of Patent: Sep. 11, 2012

(54) AUTOMATIC IDENTIFICATION OF EXECUTION PHASES IN LOAD TESTS (75) Inventors: Andre Benjamin Bondi, Red Bank, NJ (US); Christoph Kuhmuench, Monmouth Junction, NJ (US)

(73) Assignee: Siemens Corporation, Iselin, NJ (US)

( * ) Notice: Subject to any disclaimer, the term of this patent is extended or adjusted under 35 U.S.C. 154(b) by 296 days.

(21) Appl. No.: 12/765,296

(22) Filed: Apr. 22, 2010

(65) Prior Publication Data
US 2010/0274531 A1 Oct. 28, 2010

Related U.S. Application Data (60) Provisional application No. 61/172,936, filed on Apr. 27, 2009, provisional application No. 61/234,342, filed on Aug. 17, 2009.

(51) Int. Cl.
G06F 15/00 (2006.01)
G06F 9/44 (2006.01)
(52) U.S. Cl. ........................................ 702/186; 717/128
(58) Field of Classification Search .................. 702/186, 702/108; 717/128, 131; 382/156, 158
See application file for complete search history.

(56) References Cited

U.S. PATENT DOCUMENTS

| 7,406,392 B2 * | 7/2008 | Gedlinske et al. ............. 702/108 |
| 2011/0041122 A1 * | 2/2011 | Bondi et al. ................... 717/128 |

* cited by examiner

*Primary Examiner* — Bryan Bui (57) ABSTRACT

A method for automatic identification of execution phases in load test data includes receiving load test data. A period of time of the load test data is divided into a plurality of intervals. For each pair of proximate intervals of the plurality of intervals, a first interval is compared with a second interval to determine whether application execution characteristics for each of the pair of proximate intervals are substantially equivalent. The pair of proximate intervals is combined into a single interval when it is determined that the pair is substantially equivalent. Each of the pair of proximate intervals is divided into subintervals when it is determined that the pair of proximate intervals is not substantially equivalent. One or more execution phases are automatically identified as occurring between proximate intervals that are not substantially equivalent.

27 Claims, 7 Drawing Sheets

```
Static LinkedList boundaryList
mergePhases (int timeBatch, double startTime) {
        if (timeBatch < SmallestBatchSize) {
                return false
        }
        mergePhases (timeBatch/2, startTime - timeBatch/2)
        mergePhases (timeBatch/2, startTime)
        mergePhases (timeBatch/2, startTime + timeBatch/2)
        // checkPhase returns true if there is a phase boundary
at time at that batch size
        if (checkphase (timeBatch, startTime) {
                // there is a phase at this batch
                if the other mergePhases were false then
                        add this phase boundary to the boundaryList
                }
                Return true
        else {
                // there isn't a phase at this batch
                If there were no phases in a batch smaller than
this one {
                        Return false
                }
                Else {
                        Return true
                }
        }
}
```

Metacode for Bisection Method

AUTOMATIC IDENTIFICATION OF EXECUTION PHASES IN LOAD TESTS

CROSS-REFERENCE TO RELATED APPLICATION

The present application is based on provisional application Ser. No. 61/172,936, filed Apr. 27, 2009 and provisional application Ser. No. 61/234,342, filed Aug. 17, 2009, the entire contents of which are herein incorporated by reference.

BACKGROUND OF THE INVENTION

1. Technical Field

The present disclosure relates to load tests and, more specifically, to methods and systems for automatic identification of execution phases in load tests.

2. Discussion of Related Art

Modern computer software may be designed to process multiple threads of execution in a parallel fashion. Multi-threaded applications, as they are called, may include multiple program threads that are each responsible for performing a small operation that contributes to the greater application. Multiple threads may be executed concurrently using multiple microprocessors or multiple microprocessor cores. Alternatively, a single processor may interleave the execution multiple threads by switching between threads, for example, using time-division multiplexing and/or interrupts.

Development of effective real-time applications requires that the available processing power not be excessively taxed or the computer system may be unable to keep up with the computational demands presented by the application. Where the application is multi-threaded and a large number of threads may present for processing at substantially the same time, there is a particular concern that the computer system may be excessively taxed. Moreover, there is a concern that the threads should be scheduled so as to give priority for execution where required, but only where required. In addition, with multi-threaded systems, there is a concern that threads should be able to execute without being blocked by the absence of a signal or message. Accordingly, to gain insight into the manner in which computer programs tax system resources, load testing may be performed to monitor which threads are actively engaging the processor at any given time and to determine the extent to which the processor is being utilized.

By examining the data collected during load testing, a programmer can gauge potential bottlenecks within the application execution so that the software may be improved to better distribute load and avoid overtaxing of the processor.

However, as the complexity of computer programs advances, dozens or even hundreds of threads may all vie for limited processing resources. In such an event, data collected during load testing may be difficult to manually parse as there may be a great number of threads simultaneously driving processor utilization at any given time.

SUMMARY

A method for automatic identification of execution phases in load test data includes receiving load test data indicating application execution characteristics over a period of time. The period of time of the load test data is divided into a plurality of intervals. For each pair of proximate intervals of the plurality of intervals, a first interval of the pair of proximate intervals is compared with a second interval of the pair of proximate intervals to determine whether the application execution characteristics for each of the pair of proximate intervals is substantially equivalent to the other. The pair of proximate intervals is combined into a single interval when it is determined that the pair of proximate intervals are substantially equivalent. Each of the pair of proximate intervals is divided into subintervals when it is determined that the proximate intervals of a pair are not substantially equivalent. One or more execution phases are automatically identified at the boundaries of phases when the proximate intervals are not substantially equivalent.

A method for automatic identification of execution phases in load test data includes receiving load test data indicating processor utilization over a period of time. The period of time of the load test data is divided into a plurality of contiguous intervals of equal duration. For each pair of proximate intervals of the plurality of intervals, a first interval of the pair of proximate intervals is compared with a second interval of the pair of proximate intervals to determine whether processor utilization is substantially equivalent therebetween. When it is determined that the pair of proximate intervals are not substantially equivalent, the steps of dividing the not substantially equivalent pair of proximate intervals into subintervals and demining proximate pairs of subintervals that are not substantially equivalent are performed recursively until the subintervals are divided down to a desired level of granularity. A phase boundary is characterized as a time between the proximate subintervals of the desired level of granularity, A method for automatic identification of execution phases in load test data includes receiving load test data indicating processor utilization with respect to a plurality of threads over a period of time. The received load test data is graphed with time represented on a horizontal axis and processor utilization represented on a vertical axis with processor utilization attributable to each of the plurality of threads separately plotted thereon. A plurality of phases is automatically determined from the graph using image processing techniques.

A computer system includes a processor and a non-transitory, tangible, program storage medium, readable by the computer system, embodying a program of instructions executable by the processor to perform method steps for automatic identification of execution phases in load test data. The method includes receiving load test data indicating processor utilization over a period of time, dividing the period of time of the load test data into a plurality of contiguous intervals of equal duration, for each pair of proximate intervals of the plurality of intervals, comparing a first interval of the pair of proximate intervals with a second interval of the pair of proximate intervals to determine whether processor utilization is substantially equivalent therebetween. When it is determined that the pair of proximate intervals are not substantially equivalent, the steps of dividing the not substantially equivalent pair of proximate intervals into subintervals and demining proximate pairs of subintervals that are not substantially equivalent are performed recursively until the subintervals are divided down to a desired level of granularity. A phase boundary is characterized as a time between the proximate subintervals of the desired level of granularity.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to automatically parse data collected during load testing of a computer system executing a multi-threaded application so that processor utilization of the application may be simply and accurately understood. Processor utilization, as used herein, may refer to the extent to which a microprocessor such as a CPU is taxed. For example, where time division multiplexing is used, full utilization may be defined as the CPU actively processing data at every time slice while half utilization may be defined as the CPU actively processing data at one out of every two time slices, etc. The processor need not be limited to a general purpose CPU and may be, for example, a graphical processing unit (GPU), digital signal processor, or another specialized microprocessor device. Where an instance of thread execution takes less time than the duration of a time slice, the utilization of the thread may be considered to be the sum of the durations of the execution instances divided by the length of the time interval during which the measurements are taken. An instance of thread execution may take less time than the duration of a slice for one of several reasons, for example, thread termination, encountering a wait semaphore operation that causes it to sleep or otherwise suspend execution, execution of I/O, or preemption by a thread of higher priority, Exemplary embodiments of the present invention may involve automatic identification of one or more phases of application execution. Each phase may represent a recognizable change in processor utilization. In this context, processor utilization may be understood not only as a utilization level from 0%, representing an idle processor, to 100% representing constant utilization, but also, processor utilization may be characterized by a level of processor utilization attributable to each of a set of threads being processed at substantially the same time. Thus one phase may be characterized as a period of time in which the processor is engaged in executing thread $H_1$ and $H_2$, each at a high level of utilization, and another phase may be characterized as a period of time in which the processor is no longer engaged in executing thread $H_1$, is engaged in executing thread $H_2$ only at a low level of utilization, and is also engaged in executing threads $H_3$ and $H_4$ each at a moderate level of execution. Thus distinct phases may be identified as having distinct processor utilization characteristics with respect to the set of threads being executed.

Phases may occur, for example, because one thread changes its behavior or because a profile of multiple threads changes behavior. Where there are many threads, it may be useful to know where the boundary point between phases is located so that one may determine what is happening at that moment in application execution, for example, by cross-referencing phase times with time stamps in event logs. Alternatively, or additionally, determined phase boundaries may be cross-referenced with known execution paths for messages that are passed from one thread to the next so that the effect of these messages on processor utilization may be understood.

Figure 1:
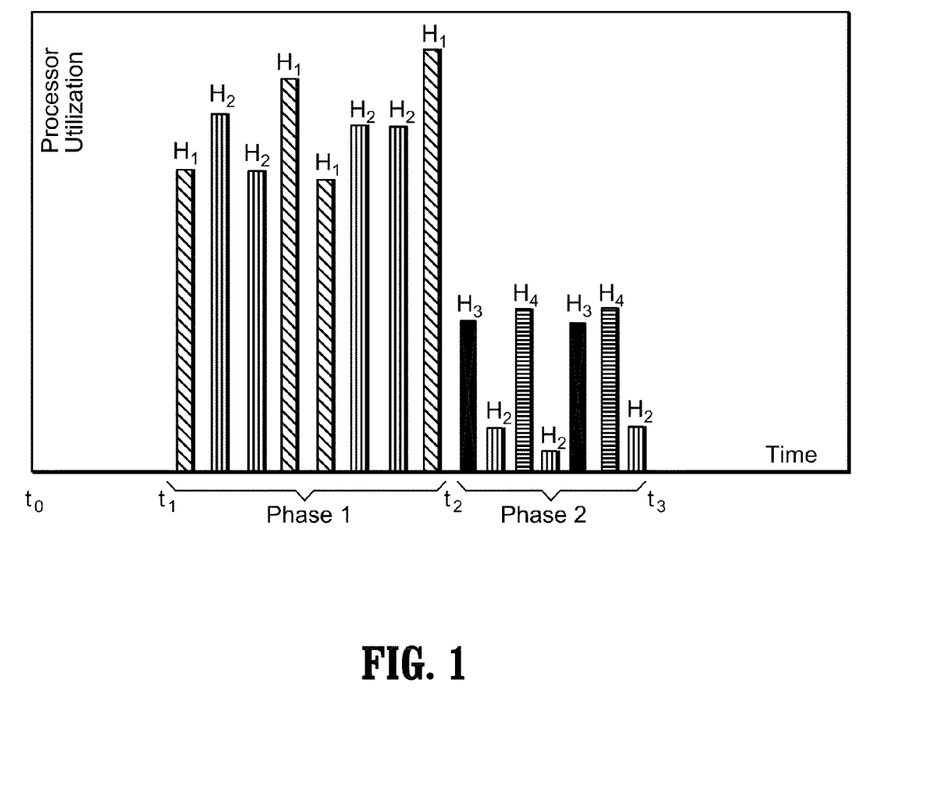
FIG. 1 shows a simplified illustration of load testing data.

FIG. 1 is a simplified illustration of load testing data corresponding to the example discussed above. As can be seen in this figure, four threads $H_1$ to $H_4$ contribute to processor utilization to different extents over time. Examination of the illustration may thus reveal that there is a first phase "Phase 1" between times $t_1$ and $t_2$ in which the processor is engaged in executing thread $H_1$ and $H_2$, each at a high level of utilization and there is a second phase "Phase 2" between times $t_2$ and $t_3$ in which the processor is no longer engaged in executing thread $H_1$, is engaged in executing thread $H_2$ at a low level of utilization, and is also engaged in executing threads $H_3$ and $H_4$ each at a moderate level of execution.

By analyzing processor performance in terms of distinct phases, programmers may cross-reference phase-boundary times against time stamps in system event logs so that it can be determined what actions had transpired to implement the phase boundary. Then, information pertaining to phases of excessive processor utilization may be used to streamline the program to reduce excessive utilization.

While phases may be manually identified in the case illustrated in FIG. 1, where there are dozens, hundreds, or more threads vying for processor utilization, manual identification of phases may not be possible. This is because large number of threads in the system under study (for example, about 100) may make accurate visual identification of all but the most obvious phase changes very difficult.

Figure 2:
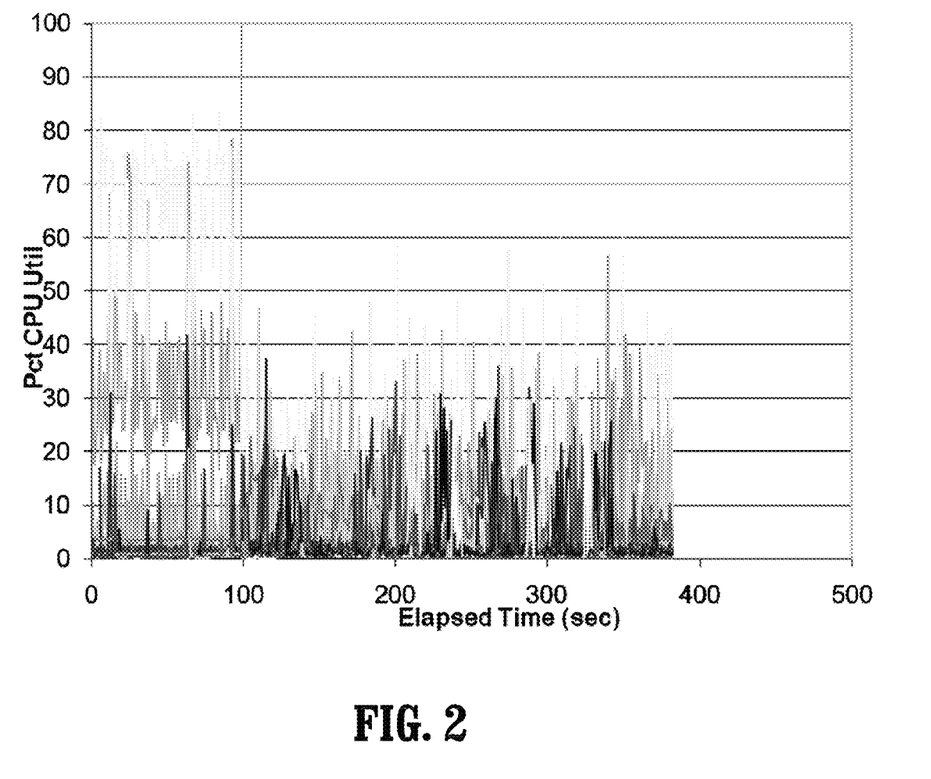
FIG. 2 shows an illustration of a complex set of load test data in which there are a relatively large number of threads being executed.

FIG. 2 is an illustration of a complex set of load test data in which there are a relatively large number of threads being executed. Here, the computer application under test is an alarm monitoring application with multiple detection devices. In the event of conditions that may give rise to an alarm, a great number of zones may be in alarm at substantially the same time and accordingly, there exists a possibility for a burst of dozens if not hundreds of messages from one or more detection devices scattered over a broad area to contribute to the substantially simultaneous demand for execution by a large number threads. Because of the large number of threads, it is difficult to manually differentiate between distinct phases.

Exemplary embodiments of the present invention, however, are not limited to the case in which processor utilization is captured with respect to alarm monitoring. Exemplary embodiments of the present invention may be applied to analyzing any load test data where load is bursty, such as network management systems, systems that monitor production lines such as printing presses, and the like.

Figure 3:
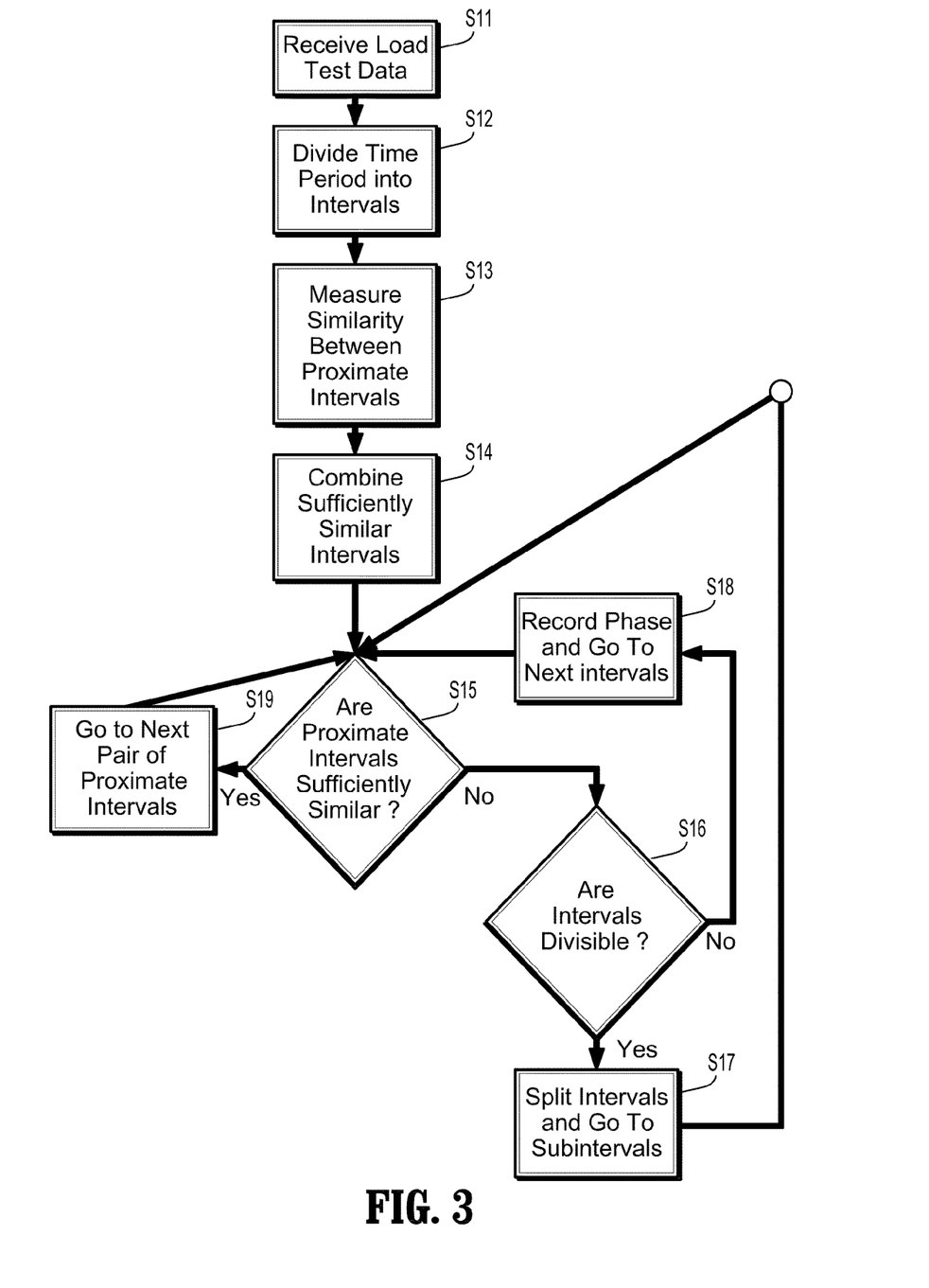
FIG. 3 is a flow chart illustrating an approach for automatic identification of phases within load test data according to an exemplary embodiment of the present invention.

Accordingly, exemplary embodiments of the present invention seek to automatically identify execution phases from within load test data where there may be a relatively large number of threads to assess the performance of the system and to isolate system bottlenecks. FIG. 3 is a flow chart illustrating an approach for automatic identification of phases within load test data according to an exemplary embodiment of the present invention. First, load test data may be received (Step S11). Load test data may be acquired by running background monitoring software to capture processor utilization and active threads over time. This monitoring software may be passive in nature and as such should not affect processor utilization or performance. For example, in the system under study, a scheduler may be equipped with a tracer that non-invasively captures the start and stop times of every thread execution and the reason why the particular thread ceded control of the processor. These reasons may include, for example, waiting at a semaphore, preemption by a higher priority thread, timer interrupts upon completion of time slices, and completion of execution. The scheduler traces may also show the entire sequence of how much of the time is spent handling interrupts of various types.

Examining the evolution of thread scheduler traces can yield insights into ways to reduce the total amount of time needed to process all the messages by facilitating the identification of processing hot spots.

While much of this collected data may be useful in analyzing and improving the system under test, the load test data may at a minimum include an indication to the rate of processor utilization over time as well as the extent to which each active thread contributes to processor utilization.

While any data format may be suitable, the disclosure herein may refer to the received load test data in terms of threads h (i,t), wherein i represents the thread number, which may be a positive integer from 1 to n, which is the maximum number of threads and t represents time. The load test data may thus include processor utilization data represented as u (i,t). Thus, for a given thread i and at a time t, u indicates processor utilization. Processor utilization may be expressed as a value between 0, representing idleness, and 1, representing full utilization. Accordingly, $0 \leq u(i,t) \leq 1$.

Next, the total time period may be divided into a set of contiguous time internals (k) of equal duration (Step S12). Thus, the first time interval may extend from t=0 to t=k, the second time interval may extend from t=k to t=k+1, the third time interval may extend from time t=k+1 to t=k+2, etc. Each time interval may be thought of as a possible phase as exemplary embodiments of the present invention seek to adjust the composition of these time intervals through a sequence of combining and splitting of intervals until the recomposed time intervals accurately represent distinct phases of processor utilization.

Similarity may then be measured between proximate pairs of intervals (Step S13). For example, the first time interval k may be compared to the second time interval k+1 and the second time interval k+1 may be compared to the third time interval k+2, etc. The comparisons seek to determine whether there is an identifiable difference between processor utilization in the first time interval of the pair and the second time interval of the pair. Statistical methods may be used to implement these comparisons. These comparisons need not be overly complex and in particular, they may be computationally simple as all that may need to be ascertained is whether there is a likely change of phase from the first time interval of the pair to the second time interval of the pair.

According to exemplary embodiment of the present invention, successive intervals may be said to be dissimilar where the distributions of running threads h (i,t) is substantially different over the successive time intervals or the processor utilization u (i,t) is substantially different over the successive time intervals. For example if the set of invoked threads differs from one interval to the next, there may be at least one index j such that h (j, k)=0 and h (j, k)≠0. Alternatively, or additionally, similarity may be measured by comparing an average number of times that thread switching has occurred within the intervals being compared. This average number of thread switches may be measured as a number over a given time interval length, because, as described in detail below, intervals may be of different lengths.

In such a case, a threshold may be established to differentiate between similar and dissimilar intervals. This threshold may be set as, for example, an order of magnitude difference or a difference by a factor of at least 1.5 times, although other suitable thresholds may be used. Here the profile of thread executions h (j, k) may be assumed to follow a multinomial distribution in each interval and as such, similarity between intervals may be obtained by comparing multinomial distribution characteristics.

Figure 4:
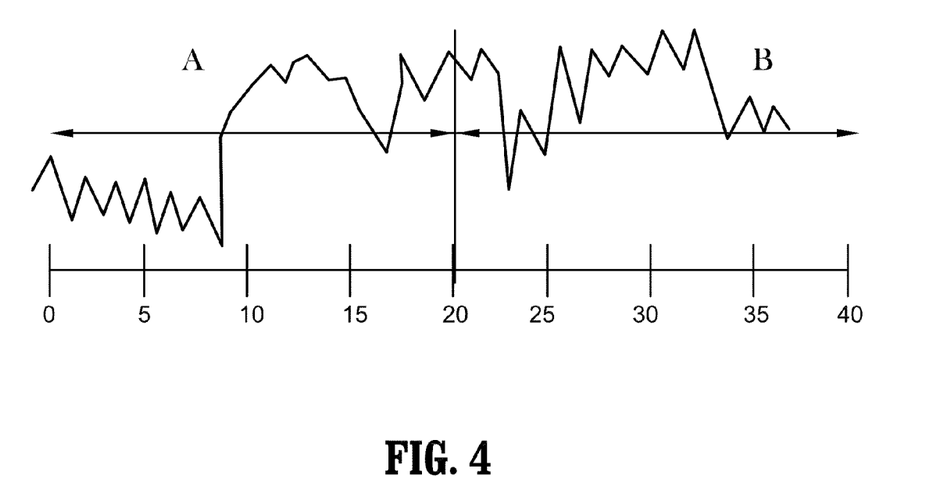
FIG. 4 is a graph illustrating an approach for determining if proximate intervals are sufficiently similar according to an exemplary embodiment of the present invention.

FIG. 4 is a graph illustrating an approach for determining if proximate intervals are sufficiently similar according to an exemplary embodiment of the present invention. Here, the graph illustrates a time frame from 0 seconds to 40 seconds. The time frame is divided into two equal and proximate intervals A and B where A spans the time between 0 and 20 seconds and B spans the time between 20 and 40 seconds. A goodness-of-fit test may be employed on the measure of processor utilization within interval A as compared to the processor utilization within interval B. As the goodness-of-fit test may reveal that the two intervals are not substantially equivalent, it may be determined that a preliminary phase boundary exists between the two intervals.

Accordingly, similarity of intervals may be established by determining whether the proximate intervals are statistically the same. Exemplary embodiments of the present invention may define statistical sameness as the event where the empirical distribution of a set of values in one interval is not significantly different from the corresponding empirical distribution in the next interval. Statistical difference could be determined, for example, by performance of a goodness-to-fit test or using empirical distribution functions rather than complex digital signal processing methods such as Kalman filters, which may assume normality and possibly linearity, or Fourier transform and related methods. Accordingly, exemplary embodiments of the present invention may utilize a distribution-free testing approach for the identification of segments of phased behavior.

Alternatively, exemplary embodiments of the present invention may utilize image processing approaches to distinguish between similar and dissimilar intervals. Such images may first generate a plot of thread-specific processor utilization as a function of time, such as the plot illustrated in FIG. 2 and then visually search for one or more phases within the plotted data, for example, using trained classifiers or other image recognition techniques.

For example, a plot may be generated in which the time axis is oriented as the horizontal and a processor performance metric is oriented as the vertical axis, then distinct vertical segments of the image may be identified by characterizing the positional and quantitative distributions of dots of different colors representing distinct threads of execution.

Each pair of proximate intervals that are determined to be similar may then be combined to form a single larger interval (Step S14). By combining similar adjacent intervals, later computational expense may be saved by reducing the number of intervals that are handled.

Exemplary embodiments of the present invention may thus combine proximate intervals when it is determined that no boundary between phases occurs between the pair of intervals. This process may be referred to herein as interval merging.

Next, an interval bisection process may be performed (Steps S15-S19). In interval bisection, proximate intervals that are determined to be sufficiently different may each be split into two equally sized sub-intervals and the process of comparison and splitting may be recursively performed to hone in on the point where the change in processor utilization characteristics occurs. Splitting may be performed up until a desired level of granularity. The desired level of granularity may be set such that it is small enough to accurately place the phase boundaries such that correlation between program elements may be gauged but not so small that the computational burden becomes unnecessarily high. For example, the finest level of granularity may be set as somewhere between 20 seconds and a $100^{th}$ of a second, but in particular, 5 seconds, 2 seconds, 1 second, ½ second, or ¼ second.

Figure 5:
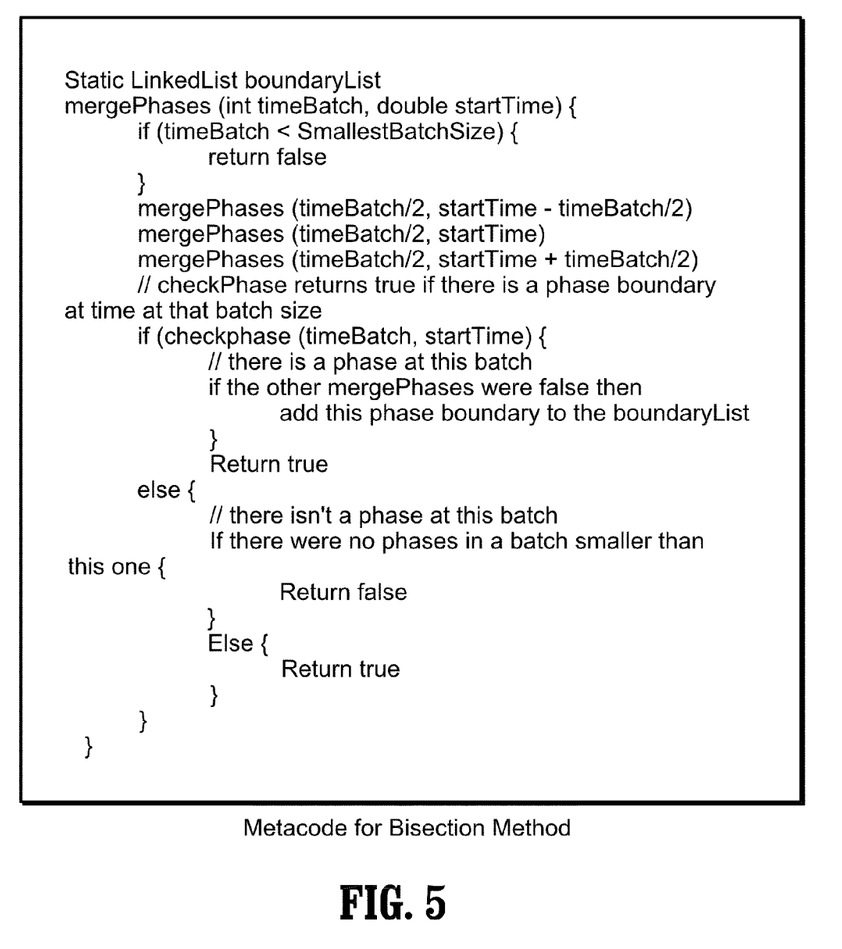
FIG. 5 is metacode for implementing bisection according to an exemplary embodiment of the present invention.

FIG. 5 shows metacode for implementing bisection according to an exemplary embodiment of the present invention.

The bisection approach may begin with a determination as to whether proximate intervals, for example, (k,k+1) and (k+1,k+2) are sufficiently similar (Step S15). If they are sufficiently similar (Yes, Step S19), then the next set of intervals may be compared, for example, (k,k+2) and (k,k+3). If, however, they are not sufficiently similar (No, Step S15), then it is determined whether the interval may be further divisible (Step S16). Divisibility may be based, for example, on whether the existing intervals are larger than the level of finest granularity so that once finest granularity has been achieved, no further divisions are performed. However, if the intervals are divisible (Yes, Step S16) then each of the intervals being compared, here (k,k+1) and (k+1,k+2), may be split into subintervals (Step S17). Splitting of the intervals may be performed, for example, by equally dividing the interval into two subintervals. For example, (k,k+1) may be divided into (k,k+½) and (k+½,k+1), and (k+1,k+2) may be divided into (k+1,k+1½) and (k+1½,k+2).

After the two dissimilar intervals have each been split (Step S17), the comparison and splitting process may be recursively performed with respect to the subintervals (Step S15). For example, (k,k+½) and (k+½,k+1) may be compared, (k+½,k+1) and (k+1,k+1½) may be compared, and (k+1,k+1½) and (k+1½,k+2) may be compared. Additionally, (k+1½,k+2) may be compared with the next interval (k+2,k+3).

Accordingly, the change that is detectable between (k,k+1) and (k+1,k+2) may be found within one or more of the various subinterval comparisons. For example, it may be detected between (k+½,k+1) and (k+1,k+1½). In such a case, these two subintervals may be recursively split and compared provided that the maximum level of granularity has not been achieved. For example, these intervals may be split into the subintervals (k+½, k+¾), (k+¾, k+1), (k+1, k+1¼), and (k+1¼, k+1½). Now assuming that after comparisons of these sub intervals it is determined that the difference is found between (k+½, k+¾), and assuming that this represents the finest desired level of granularity (No, Step S16), the phase change is recorded as occurring between these two subintervals (Step S18). After the phase boundary has been recorded, the recursive process steps back and the next set of subintervals are compared, for example, (k+1, k+2) and (k+2, k+3).

The process may end when all intervals have been compared, and where necessary, appropriately subdivided.

Exemplary embodiments of the present invention may also intermix the steps of combining sufficiently similar intervals and recursively splitting dissimilar intervals so that split intervals may be recombined where no difference has been detected therebetween.

Figure 6:
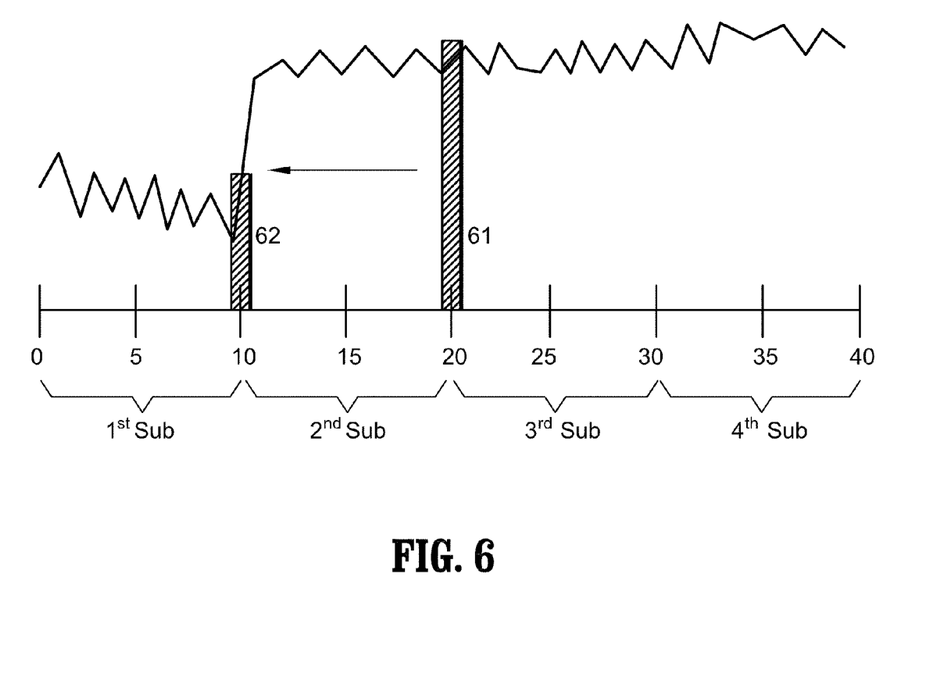
FIG. 6 is a graph illustrating interval bisection according to an exemplary embodiment of the present invention.

FIG. 6 is a graph illustrating interval bisection according to an exemplary embodiment of the present invention. The taller vertical line 61 may represent original interval delineation at the second mark, for example, as shown in FIG. 4. However, after it is determined that intervals A and B of FIG. 4 are not equivalent, each interval may be divided, for example, into a first subinterval between 0 and 10, a second subinterval between 10 and 20, a third subinterval between 20 and 30 and a fourth subinterval between 30 and 40. Subsequent processing, as described above, may lead to the determination that there is a detectable difference between the first and second subinterval, but no detectable difference between the second and third or third and fourth subintervals. Accordingly, the second, third, and fourth subintervals may be combined and the phase boundary may be recorded at the shorter vertical line 62. Accordingly, the original intervals may thus be refined to identify distinct phases.

As indicated above, exemplary embodiments of the present invention are not limited to the use of the goodness-to-fit test in determining statistical difference. Exemplary embodiments of the present invention may utilize other statistical approaches and tests for determining whether processor usage is similar or dissimilar between proximate time intervals. For example, to determine where phase boundary occurs, significant change points within the data may be identified. To find these change points, exemplary embodiments of the present invention may examine the average values of processor utilization in the successive contiguous intervals, and use a statistical. This may be accomplished, for example, by applying a Student's t test of the equality of means during adjacent intervals to the average processor utilizations of each thread. Two adjacent intervals may be assigned to the same phase if the average processor utilization of corresponding threads are not significantly different from one interval to the next.

Rather than comparing an average processor utilization, or another performance measure, observed in adjacent intervals directly, each interval may be divided into smaller intervals of equal length. This splitting may provide samples from which the mean and variance may be computed over each interval. These statistics may be used as inputs to t tests of the equality of means. The t test may be used because the means and variances in each interval are unknown. This may be performed for each thread. If the difference for at least one thread is significant, a phase change may be recorded.

Because successive statistical tests may result in merging or splitting of intervals, adjacent intervals may have different lengths. For example, if the configured subinterval length is 1 second, the left interval is 10 seconds long, and the adjacent interval to the right is 20 seconds long, the number of samples in the two intervals may be 10 and 20 respectively. Thus, the sample sizes in the intervals may be different. This difference may be overcome by utilizing Welch's approximate method of computing the T statistic used to test for the equality of means of each interval. This approximation may entail computing an estimate of the variance used in the t statistic, as well as an estimate of the number of degrees of freedom of the statistic to compensate for the inequality of the sizes of the two samples.

The approximate estimator of the standard deviation of the difference in means may be given by:

$$S_{x_1 - x_2} \approx \sqrt{\frac{S_1^2}{n_1} + \frac{S_2^2}{n_2}} \quad (1)$$

where $S_i^2$ denotes the unbiased estimator of the variance of observations from the $i^{th}$ interval, and $n_i$ denotes the corresponding sample size. The statistic uses for the t test may be:

$$t \approx \frac{X_1 - X_2}{S_{x_1 - x_2}} \quad (2)$$

where $X_i$ denotes the mean of the observations in the $i^{th}$ interval. The number of degrees of freedom used in the t test is given by:

$$df \approx \frac{(S_1^2/n_1 + S_2^2/n_2)^2}{\frac{(S_1^2/n_1)^2}{n_1 - 1} + \frac{(S_2^2/n_2)^2}{n_2 - 1}} \quad (3)$$

If df is not an integer, an approximate critical value of the T distribution may be obtained by interpolating critical values for the nearest integers above and below df for the desired $\alpha$ value.

The resulting $100(1-\alpha)$ % confidence interval for the difference of means may be given by:

$$X_1 - X_2 \pm t_{df, 1-\frac{\alpha}{2}} \left[ \frac{S_1^2}{n_1} + \frac{S_2^2}{n_2} \right]^{\frac{1}{2}} \quad (4)$$

Figure 7:
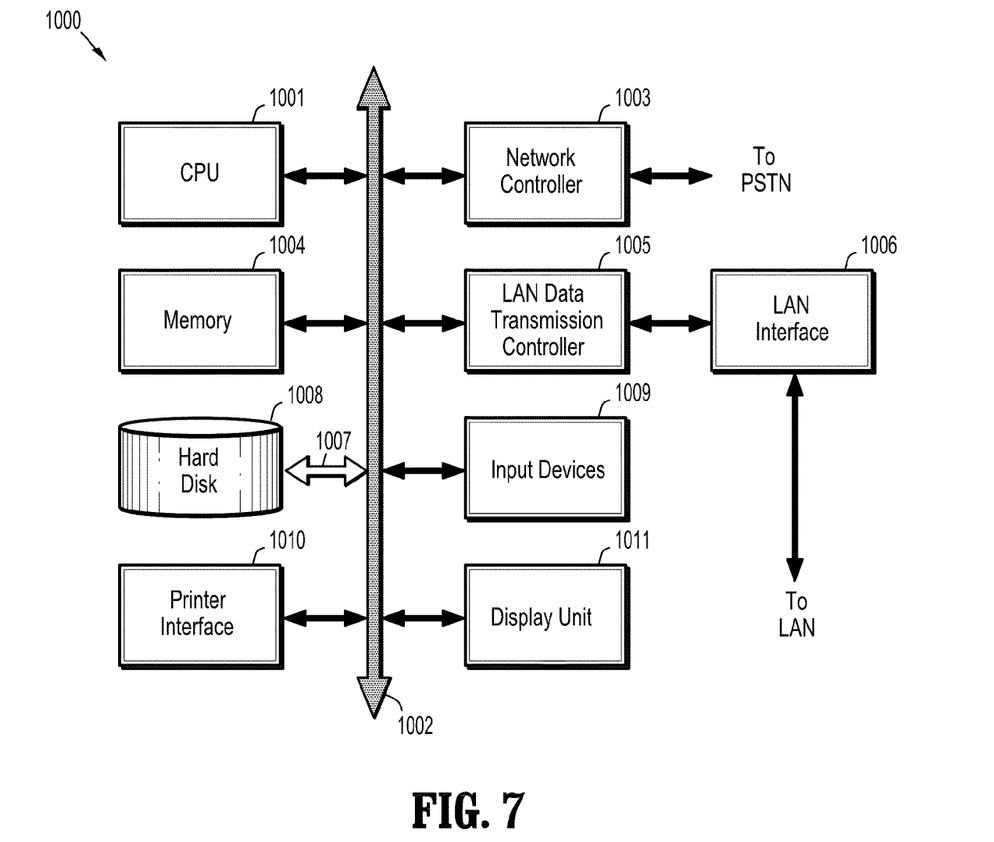
FIG. 7 shows an example of a computer system capable of implementing the method and apparatus according to embodiments of the present disclosure.

FIG. 7 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for automatic identification of execution phases in load test data, comprising:
   receiving load test data indicating application execution characteristics over a period of time;
   dividing the period of time of the load test data into a plurality of intervals;
   for each pair of proximate intervals of the plurality of intervals, comparing a first interval of the pair of proximate intervals with a second interval of the pair of proximate intervals to determine whether the application execution characteristics for each of the pair of proximate intervals are substantially equivalent;
   combining the pair of proximate intervals into a single interval when it is determined that the pair of proximate intervals are substantially equivalent; and
   dividing each of the pair of proximate intervals into subintervals when it is determined that the pair of proximate intervals are not substantially equivalent, wherein one or more execution phases are automatically identified as occurring between proximate intervals are that not substantially equivalent,
   wherein each of the above steps is performed using a computer system.

2. The method of claim 1, wherein the application execution characteristics include processor utilization.

3. The method of claim 1, wherein the application execution characteristics include thread execution data.

4. The method of claim 1, wherein the load test data includes processor utilization over time attributable to one or more distinct threads.

5. The method of claim 4, wherein determining whether application execution characteristics are substantially equivalent between the pair of proximate intervals includes determining whether processor utilization attributable to each of the one or more distinct threads is substantially equivalent.

6. The method of claim 1, wherein the period of time of the load test data is divided into a plurality of intervals of equal duration.

7. The method of claim 1, wherein the first interval of the pair of proximate intervals is compared with the second interval of the pair of proximate intervals using a statistical measure of sameness.

8. The method of claim 7, wherein the statistical measure of sameness includes a goodness-of-fit test.

9. The method of claim 7, wherein the statistical measure of sameness includes one or more empirical distribution functions.

10. The method of claim 1, wherein the first interval of the pair of proximate intervals is compared with the second interval of the pair of proximate intervals using a distribution-free testing approach.

11. The method of claim 1, wherein the process of dividing intervals into subintervals and comparing subintervals is performed recursively up to a desired level of granularity.

12. A method for automatic identification of execution phases in load test data, comprising:
   receiving load test data indicating processor utilization over a period of time;
   dividing the period of time of the load test data into a plurality of contiguous intervals of equal duration;
   for each pair of proximate intervals of the plurality of intervals, comparing a first interval of the pair of proximate intervals with a second interval of the pair of proximate intervals to determine whether processor utilization is substantially equivalent therebetween; and
   when it is determined that the pair of proximate intervals are not substantially equivalent, recursively performing the steps of dividing the not substantially equivalent pair of proximate intervals into subintervals and demining proximate pairs of subintervals that are not substantially equivalent until the subintervals are divided down to a desired level of granularity, and characterizing a phase boundary as a time between the proximate subintervals of the desired level of granularity,
   wherein each of the above steps is performed using a computer system.

13. The method of claim 12, wherein the load test data includes processor utilization over time attributable to one or more distinct threads.

14. The method of claim 13, wherein determining whether processor utilization is substantially equivalent between the pair of proximate intervals includes determining whether processor utilization attributable to each of the one or more distinct threads is substantially equivalent.

15. The method of claim 12, wherein pairs of proximate intervals determined to be substantially equivalent are merged into a single interval.

16. The method of claim 12, wherein the first interval of the pair of proximate intervals is compared with the second interval of the pair of proximate intervals using a statistical measure of sameness.

17. The method of claim 16, wherein the statistical measure of sameness includes a goodness-of-fit test.

18. The method of claim 16, wherein the statistical measure of sameness includes one or more empirical distribution functions.

19. The method of claim 12, wherein the first interval of the pair of proximate intervals is compared with the second interval of the pair of proximate intervals using a distribution-free testing approach.

20. A method for automatic identification of execution phases in load test data, comprising:
receiving load test data indicating processor utilization with respect to a plurality of threads over a period of time;
generating, in an image processing device, a graphical representation of the received load test data, the graphical representation including time represented on a horizontal axis and processor utilization represented on a vertical axis with processor utilization attributable to each of the plurality of threads separately plotted thereon, and
automatically analyzing the generated graphical representation of the received load test data in the image processing device to identify a plurality of phases within the generated graphical representation using image processing techniques based on an appearance of the generated graphical representation, as represented within the image processing device.

21. The method of claim 20, wherein the image processing techniques include the use of one or more trained classifiers.

22. The method of claim 21, wherein the one or more trained classifiers were trained using a set of test data including graphs of thread-wise processor utilization and predetermined phases.

23. A computer system comprising:
a processor; and
a non-transitory, tangible, program storage medium, readable by the computer system, embodying a program of instructions executable by the processor to perform method steps for automatic identification of execution phases in load test data, the method comprising:
receiving load test data indicating processor utilization over a period of time;
dividing the period of time of the load test data into a plurality of contiguous intervals of equal duration;
for each pair of proximate intervals of the plurality of intervals, comparing a first interval of the pair of proximate intervals with a second interval of the pair of proximate intervals to determine whether processor utilization is substantially equivalent therebetween; and
when it is determined that the pair of proximate intervals are not substantially equivalent, recursively performing the steps of dividing the not substantially equivalent pair of proximate intervals into subintervals and demining proximate pairs of subintervals that are not substantially equivalent until the subintervals are divided down to a desired level of granularity, and characterizing a phase boundary as a time between the proximate subintervals of the desired level of granularity.

24. The computer system of claim 23, wherein determining whether processor utilization is substantially equivalent between the pair of proximate intervals includes determining whether processor utilization attributable to each of the one or more distinct threads is substantially equivalent.

25. The computer system of claim 23, wherein pairs of proximate intervals determined to be substantially equivalent are merged into a single interval.

26. The computer system of claim 23, wherein the first interval of the pair of proximate intervals is compared with the second interval of the pair of proximate intervals using a statistical measure of sameness.

27. The computer system of claim 26, wherein the statistical measure of sameness includes a goodness-of-fit test.

* * * * *